(12) United States Patent
Yu et al.

(10) Patent No.: US 10,871,331 B2
(45) Date of Patent: Dec. 22, 2020

(54) COOLING DEVICE AND MOTOR UTILIZING A HEATING ELEMENT TO CIRCULATE COOLING

(71) Applicants: NIDEC CORPORATION, Kyoto (JP); National University Corporation YOKOHAMA National University, Kanagawa (JP)

(72) Inventors: Quing Yu, Kanagawa (JP); Tatsuya Noda, Kanagawa (JP); Shunichi Tanaka, Kanagawa (JP); Yoshinobu Nakamura, Kyoto (JP); Masato Nakanishi, Kyoto (JP)

(73) Assignees: NIDEC CORPORATION, Kyoto (JP); NATIONAL UNIVERSITY CORPORATION YOKOHAMA NATIONAL UNIVERSITY, Kanagawa (JP)

( * ) Notice: Subject to any disclaimer, the term of this patent is extended or adjusted under 35 U.S.C. 154(b) by 314 days.

(21) Appl. No.: 15/750,503

(22) PCT Filed: Jul. 28, 2016

(86) PCT No.: PCT/JP2016/072218
§ 371 (c)(1),
(2) Date: Feb. 6, 2018

(87) PCT Pub. No.: WO2017/022639
PCT Pub. Date: Feb. 9, 2017

(65) Prior Publication Data
US 2018/0231325 A1 Aug. 16, 2018

(30) Foreign Application Priority Data
Aug. 6, 2015 (JP) ................................. 2015-156413

(51) Int. Cl.
*F28D 15/02* (2006.01)
*H02K 9/19* (2006.01)
(Continued)

(52) U.S. Cl.
CPC ......... *F28D 15/0233* (2013.01); *F28D 15/02* (2013.01); *F28D 15/0241* (2013.01);
(Continued)

(58) Field of Classification Search
CPC .. H02K 9/19; H02K 9/20; F28D 15/02; F28D 15/0233; F28D 15/0241; F28D 15/0266;
(Continued)

(56) References Cited

U.S. PATENT DOCUMENTS 2,873,393 A * 2/1959 Baudry .................. H02K 9/005
310/55
4,352,034 A * 9/1982 Karhan .................... H02K 9/10
310/59

(Continued)

FOREIGN PATENT DOCUMENTS

JP S53117921 9/1978
JP S5496710 7/1979
(Continued)

OTHER PUBLICATIONS

"International Search Report (Form PCT/ISA/210) of PCT/JP2016/072218", dated Oct. 18, 2016, with English translation thereof, pp. 1-4.

*Primary Examiner* — Tulsidas C Patel
*Assistant Examiner* — Rashad H Johnson
(74) *Attorney, Agent, or Firm* — JCIPRNET

(57) ABSTRACT

A cooling device and a motor are provided. The cooling device that cools a heating element is provided with: a cooling chamber for cooling the heating element with a first cooling medium; a radiator chamber for releasing the heat of
(Continued)

the first cooling medium to the outside; and a first connection path and a second connection path for connecting the cooling chamber and the radiator chamber. When part of the first cooling medium in the cooling chamber is gasified, at least part of the gasified first cooling medium moves into the first connection path, thus causing a circulation in which the first cooling medium in the cooling chamber flows into the radiator chamber via the first connection path, and the first cooling medium in the radiator chamber flows into the cooling chamber via the second connection path.

3 Claims, 8 Drawing Sheets

(51) Int. Cl.
*F28F 3/08* (2006.01)
*H02K 9/20* (2006.01)
*F28D 21/00* (2006.01)

(52) U.S. Cl.
CPC .......... *F28D 15/0266* (2013.01); *F28F 3/086* (2013.01); *H02K 9/19* (2013.01); *H02K 9/20* (2013.01); *F28D 2015/0291* (2013.01); *F28D 2021/004* (2013.01); *F28D 2021/0028* (2013.01); *F28F 2265/12* (2013.01); *F28F 2265/14* (2013.01)

(58) Field of Classification Search
CPC ..... F28D 2015/0291; F28D 2021/0028; F28D 2021/004; F28F 2265/14; F28F 3/086

USPC .................................. 310/52, 54, 58, 63, 64
See application file for complete search history.

(56) References Cited

U.S. PATENT DOCUMENTS

| | | | |
|---|---|---|---|
| 10,411,562 B2* | 9/2019 | Anghel | H02K 9/19 |
| 2002/0112851 A1 | 8/2002 | O'Donnell | |
| 2006/0113851 A1* | 6/2006 | Ishihara | H02K 9/20 310/52 |
| 2007/0199339 A1* | 8/2007 | Ishihara | B60K 7/0007 62/242 |
| 2007/0273024 A1 | 11/2007 | Madsen et al. | |
| 2010/0045125 A1* | 2/2010 | Takenaka | H02K 1/20 310/54 |
| 2011/0140551 A1* | 6/2011 | Adaniya | H02K 9/19 310/64 |
| 2015/0001349 A1 | 1/2015 | Figus | |

FOREIGN PATENT DOCUMENTS

| | | |
|---|---|---|
| JP | H04364343 | 12/1992 |
| JP | H9-23614 | 1/1997 |
| JP | 2006013408 | 1/2006 |
| JP | 2013055355 | 3/2013 |
| WO | 2010117092 | 10/2010 |
| WO | 2014099806 | 6/2014 |

* cited by examiner

COOLING DEVICE AND MOTOR UTILIZING A HEATING ELEMENT TO CIRCULATE COOLING

CROSS-REFERENCE TO RELATED APPLICATION

This application is a 371 of international application of PCT application serial no. PCT/JP2016/072218, filed on Jul. 28, 2016, which claims the priority benefits of Japan application no. JP 2015-156413, filed on Aug. 6, 2015. The entirety of each of the abovementioned patent applications is hereby incorporated by reference herein and made a part of this specification.

TECHNICAL FIELD

The present invention relates to a cooling device and a motor.

BACKGROUND ART

For example, in Patent Literature 1, a cooling device configured to cool a motor is described. In the cooling device in Patent Literature 1, a liquid refrigerant absorbs heat of a casing and evaporates, and a motor is cooled through the casing.

CITATION LIST

Patent Literature

[Patent Literature 1]
Japanese Unexamined Patent Application Publication No. H9-23614

SUMMARY OF INVENTION

Technical Problem

In the cooling device described above, in order to return the liquid refrigerant that has evaporated and become a gas to a liquid again, a condenser is necessary. When a temperature of a heat generating object to be cooled becomes higher, since an amount of the liquid refrigerant evaporated increases, a larger-sized condenser is necessary. Accordingly, there is a problem of the size of the entire cooling device increasing.

In view of the above problem, an object of an aspect of the present invention is to provide a cooling device having a structure through which it is possible to improve cooling efficiency while preventing the size increasing and a motor including such a cooling device.

Solution to Problem

According to an aspect of the present invention, there is provided a cooling device configured to cool a heating element. The cooling device includes: a cooling chamber that cools the heating element by a first cooling medium; a radiator chamber that releases heat of the first cooling medium to an outside; and a first connection path and a second connection path that connect the cooling chamber to the radiator chamber, wherein at least a part of the radiator chamber is positioned above the cooling chamber in a vertical direction, wherein a part in which the first connection path is connected to the radiator chamber is positioned at a same part in which the first connection path is connected to the cooling chamber in the vertical direction or is positioned above a part in which the first connection path is connected to the cooling chamber, and when a part of the first cooling medium in the cooling chamber is vaporized, at least a part of the first cooling medium which is vaporized moves into the first connection path, and a circulation is generated in which the first cooling medium in the cooling chamber flows to the radiator chamber through the first connection path, and the first cooling medium in the radiator chamber flows into the cooling chamber through the second connection path.

According to an aspect of the present invention, there is provided a cooling device configured to cool a heating element. The cooling device includes: a cooling chamber that cools the heating element by a first cooling medium; a radiator chamber that releases heat of the first cooling medium to an outside; and a first connection path and a second connection path that connect the cooling chamber to the radiator chamber, wherein at least a part of the radiator chamber is positioned above the cooling chamber in the vertical direction, wherein a part in which the first connection path is connected to the radiator chamber is positioned at a same part in which the first connection path is connected to the cooling chamber in the vertical direction or is positioned above a part in which the first connection path is connected to the cooling chamber, and when a part of the first cooling medium in the cooling chamber is vaporized, at least a part of the first cooling medium which is vaporized condenses in any one of the first connection path, the second connection path, and the radiator chamber.

A motor according to an aspect of the present invention includes the above cooling device.

Advantageous Effects of Invention

According to an aspect of the present invention, there are provided a cooling device having a structure through which it is possible to improve cooling efficiency while preventing the size increasing and a motor including such a cooling device.

DESCRIPTION OF EMBODIMENTS

Figure 1:
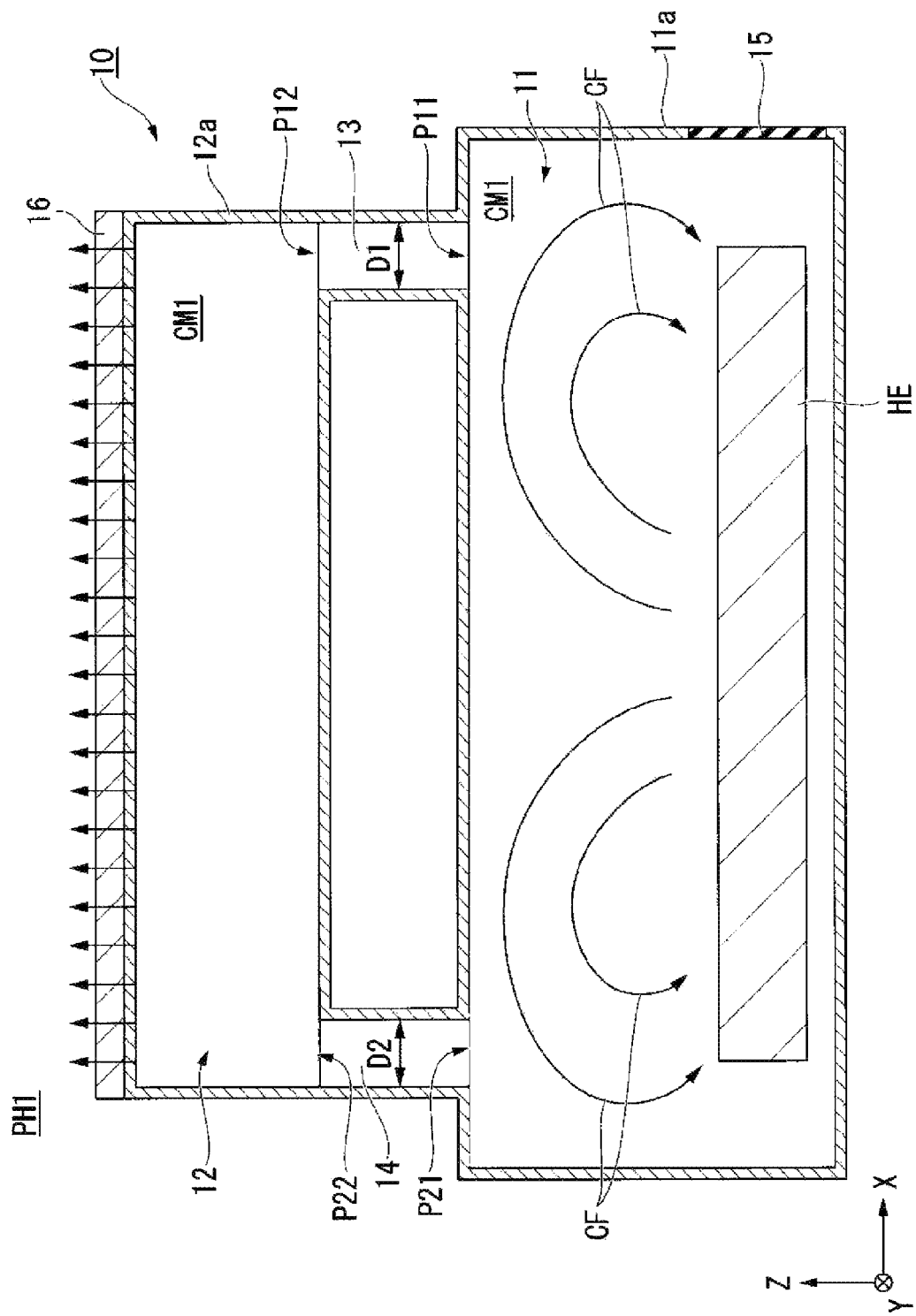
FIG. 1 is a schematic diagram showing a cooling device of the present embodiment.

A cooling device and a motor according to embodiments of the present invention will be described below with reference to the drawings. Here, the scope of the present invention is not limited to the following embodiments, and can be arbitrarily changed within the technical scope of the present invention. In addition, in the following drawings, in order to facilitate understanding of components, sizes, numbers, and the like in structures may be different from sizes, numbers, and the like in actual structures.

In addition, in the drawings, an XYZ coordinate system is appropriately shown as a three-dimensional orthogonal coordinate system. In the XYZ coordinate system, a Z axis direction is a vertical direction. An X axis direction is a direction orthogonal to the Z axis direction and is a direction in which a central axis J in FIG. 5 extends. The X axis direction is a left and right direction in FIG. 1. A Y axis direction is a direction that is orthogonal to both the X axis direction and the Z axis direction.

<Cooling Device>

Figure 2:
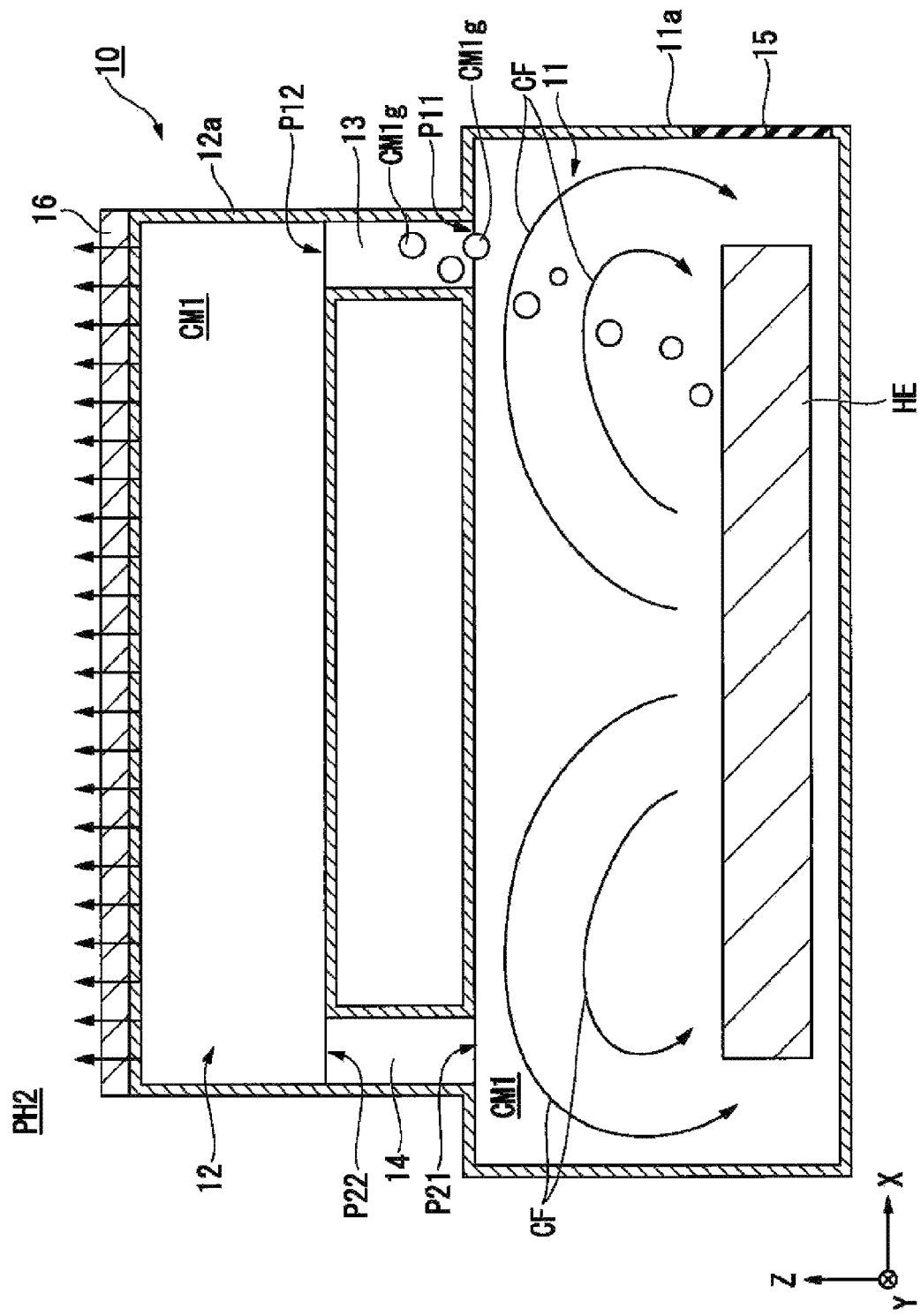
FIG. 2 is a schematic diagram showing the cooling device of the present embodiment.
Figure 3:
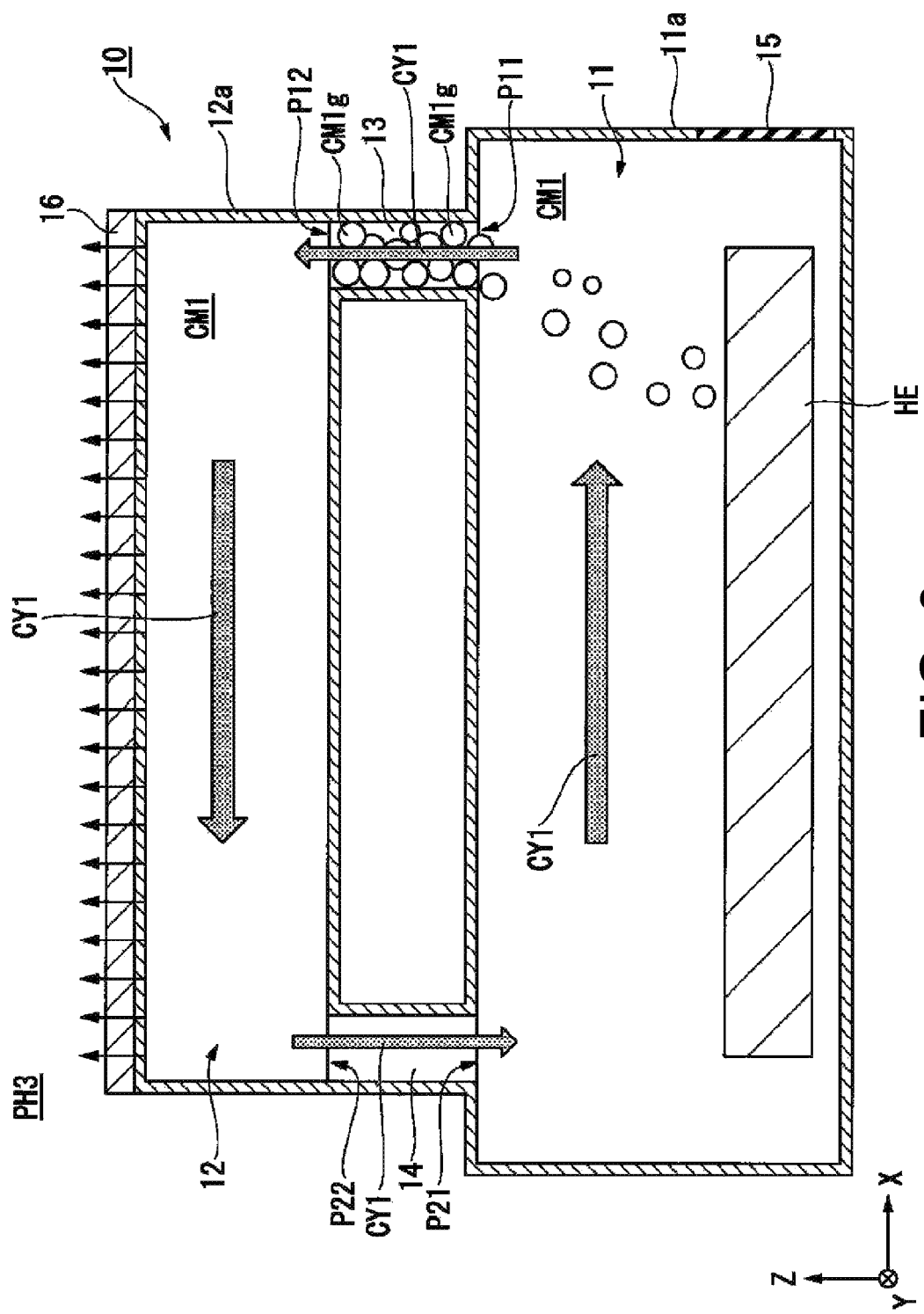
FIG. 3 is a schematic diagram showing the cooling device of the present embodiment.

FIG. 1 to FIG. 3 are schematic diagrams showing a cooling device 10 of the present embodiment. As shown in FIG. 1, the cooling device 10 cools a heating element HE. The heating element HE is, for example, a coil of a motor. The cooling device 10 includes a cooling chamber 11, a radiator chamber 12, a first connection path 13, a second connection path 14, and an elastic part 15.

A first cooling medium CM1 is filled into the cooling chamber 11, into the radiator chamber 12, into the first connection path 13, and into the second connection path 14. The first cooling medium CM1 is, for example, a fluorine-based inert liquid. The first cooling medium CM1 has, for example, an insulation property. The type of the first cooling medium CM1 can be selected according to a maximum heat generation temperature of the heating element HE.

Here, in this specification, when it is described that the first cooling medium CM1 is filled into a certain space, this is not limited to a case in which only the inside of the certain space is filled with only the first cooling medium CM1. When it is described that the first cooling medium CM1 is filled into a certain space, this includes also a case in which a substance other than the first cooling medium CM1 is housed in a certain space.

The cooling chamber 11 is surrounded by a wall 11*a*. The cooling chamber 11 cools the heating element HE using the first cooling medium CM1. In the present embodiment, the heating element HE is housed in the cooling chamber 11.

The radiator chamber 12 is surrounded by a wall 12*a*. The radiator chamber 12 releases heat of the first cooling medium CM1 to the outside. A heat absorbing part 16 is attached to the wall 12*a* of the radiator chamber 12. In the example in FIG. 1, the heat absorbing part 16 is attached to, for example, the upper side of the radiator chamber 12 in the vertical direction.

The heat absorbing part 16 is, for example, a part included in an instrument to which the cooling device 10 is attached. The heat absorbing part 16 absorbs heat from the first cooling medium CM1 in the radiator chamber 12. The heat absorbing part 16 can absorb heat from the first cooling medium CM1 in the radiator chamber 12. The heat absorbing part 16 may be, for example, a heat sink made of a member having a relatively high thermal conductivity. In addition, the heat absorbing part 16 may be a fan that blows air to the radiator chamber 12. The heat absorbing part 16 may be a member including a flow path through which a cooling medium flows.

In the present embodiment, the radiator chamber 12 releases, for example, heat of the first cooling medium CM1 to the heat absorbing part 16. At least a part of the radiator chamber 12 is positioned above the cooling chamber 11 in the vertical direction.

In the present embodiment, for example, the entire radiator chamber 12 is positioned above the cooling chamber 11 in the vertical direction.

The first connection path 13 and the second connection path 14 connect the cooling chamber 11 to the radiator chamber 12. In the present embodiment, the first connection path 13 and the second connection path 14 extend in the vertical direction (the Z axis direction). The lower end of the first connection path 13 in the vertical direction and the lower end of the second connection path 14 in the vertical direction are connected to the upper end of the cooling chamber 11 in the vertical direction. That is, the first connection path 13 and the second connection path 14 are connected to the upper end of the cooling chamber 11 in the vertical direction. The upper end of the first connection path 13 in the vertical direction and the upper end of the second connection path 14 in the vertical direction are connected to the lower end of the radiator chamber 12 in the vertical direction.

In the vertical direction (the Z axis direction), a part P12 in which the first connection path 13 is connected to the radiator chamber 12 is positioned above a part P11 in which the first connection path 13 is connected to the cooling chamber 11 in the vertical direction. In the present embodiment, the part P12 is positioned at, for example, one end (+X side) of the radiator chamber 12 in the horizontal direction. In the present embodiment, the part P11 is positioned, for example, near one end of the cooling chamber 11 in the horizontal direction.

In the vertical direction (the Z axis direction), a part P22 in which the second connection path 14 is connected to the radiator chamber 12 is positioned above a part P21 in which the second connection path 14 is connected to the cooling chamber 11 in the vertical direction. In the present embodiment, the part P22 is positioned at, for example, the other end (−X side) of the radiator chamber 12 in the horizontal direction.

In the present embodiment, the part P21 is positioned, for example, near the other end of the cooling chamber 11 in the horizontal direction.

A shape of a cross section (XY cross section) orthogonal to a direction (the Z axis direction) in which the first connection path 13 extends is not particularly limited, and may be, for example, a circular shape. A shape of a cross section (XY cross section) orthogonal to a direction (the Z axis direction) in which the second connection path 14 extends is not particularly limited, and may be, for example, a circular shape.

A size of the first connection path 13 in a direction (the X axis direction, the Y axis direction) orthogonal to the direction (the Z axis direction) in which the first connection path 13 extends and a size of the second connection path 14 in a direction (the X axis direction, the Y axis direction) orthogonal to a direction (the Z axis direction) in which the second connection path 14 extends have a size at which at least a part of the vaporized first cooling medium CM1 is retained in the first connection path 13 or the second connection path 14. In the present embodiment, the size of the first connection path 13 in a direction orthogonal to the direction in which the first connection path 13 extends is an inner diameter D1 of the first connection path 13. In the present embodiment, the size of the second connection path 14 in a direction orthogonal to the direction in which the second connection path 14 extends is an inner diameter D2 of the second connection path 14.

Specifically, the inner diameter D1 of the first connection path 13 and the inner diameter D2 of the second connection path 14 are preferably, for example, in a range of about 5 mm or more and 10 mm or less. When the inner diameter D1 and the inner diameter D2 are set to have such sizes, bubbles CM1$g$ which are the vaporized first cooling medium CM1 are likely to be retained in the first connection path 13 and in the second connection path 14.

The elastic part 15 is in contact with the first cooling medium CM1. The elastic part 15 is made of an elastic material. A material of the elastic part 15 is not particularly limited as long as the material is elastic. A material of the elastic part 15 is, for example, rubber. In the present embodiment, the elastic part 15 is, for example, a part of the wall 11$a$ constituting the cooling chamber 11.

Next, a method of cooling the heating element HE using the cooling device 10 of the present embodiment will be described. The cooling device 10 of the present embodiment includes three cooling phases, that is, a first cooling phase PH1, a second cooling phase PH2, and a third cooling phase PH3. In the cooling device 10 of the present embodiment, the three cooling phases are appropriately switched between according to a temperature of the heating element HE, and it is possible to efficiently cool the heating element HE. The three cooling phases are switched between in the order of the first cooling phase PH1, the second cooling phase PH2, and the third cooling phase PH3 as the temperature of the heating element HE increases.

FIG. 1 shows the cooling device 10 in the first cooling phase PH1. As shown in FIG. 1, the first cooling phase PH1 is a phase in which the heating element HE is cooled by a convective flow CF of the first cooling medium CM1 generated in the cooling chamber 11. When the temperature of the heating element HE increases, a temperature of the first cooling medium CM1 positioned around the heating element HE increases. Accordingly, the first cooling medium CM1 whose temperature has increased rises in the cooling chamber 11 and the convective flow CF is generated. That is, in the present embodiment, when the temperature of the first cooling medium CM1 has increased, the convective flow CF of the first cooling medium CM1 is generated in the cooling chamber 11.

When the convective flow CF is generated, the first cooling medium CM1 is stirred in the cooling chamber 11 by the convective flow CF. Accordingly, the first cooling medium CM1 positioned around the heating element HE can be circulated in the cooling chamber 11 and the heating element HE can be cooled. In the first cooling phase PH1, the temperature of the heating element HE is lower than a boiling point of the first cooling medium CM1.

Here, in the present embodiment, the cooling chamber 11 is connected to the radiator chamber 12 at only the first connection path 13 and the second connection path 14. Therefore, in a natural state, the first cooling medium CM1 is unlikely to be circulated between the first cooling medium CM1 in the cooling chamber 11 and the first cooling medium CM1 in the radiator chamber 12.

Here, in this specification, the natural state includes a state in which no first cooling medium CM1 is vaporized and a state in which, even if the first cooling medium CM1 is vaporized, no bubbles CM1$g$ to be described below are retained in the first connection path 13 or the second connection path 14. In this specification, the natural state includes the first cooling phase PH1 and the second cooling phase PH2. That is, in the first cooling phase PH1 and the second cooling phase PH2, a circulation CY1 of the first cooling medium CM1 to be described below is unlikely to be generated between the cooling chamber 11 and the radiator chamber 12.

When a circulation of the first cooling medium CM1 is unlikely to be generated between the cooling chamber 11 and the radiator chamber 12, heat exchange is unlikely to occur between the cooling chamber 11 and the radiator chamber 12. Since the first cooling medium CM1 in the cooling chamber 11 cools the heating element HE, the temperature is likely to relatively increase. On the other hand, since the first cooling medium CM1 in the radiator chamber 12 releases heat to the outside, the temperature is likely to relatively decrease. Therefore, in the natural state, the temperature of the first cooling medium CM1 in the radiator chamber 12 remains relatively low.

In addition, when a circulation of the first cooling medium CM1 is not generated between the cooling chamber 11 and the radiator chamber 12, in the first connection path 13 and the second connection path 14 that connect the cooling chamber 11 and the radiator chamber 12, the temperature of the first cooling medium CM1 remains relatively low.

In the first cooling phase PH1, when the heating element HE cannot be sufficiently cooled and the temperature of the heating element HE is equal to or higher than the boiling point of the first cooling medium CM1, the cooling phase transitions from the first cooling phase PH1 to the second cooling phase PH2.

FIG. 2 shows the cooling device 10 in the second cooling phase PH2. As shown in FIG. 2, the second cooling phase PH2 is a phase in which the heating element HE is cooled by the convective flow CF of the first cooling medium CM1 and vaporization of the first cooling medium CM1.

In the second cooling phase PH2, when the temperature of the heating element HE is equal to or higher than the boiling point of the first cooling medium CM1, the first cooling medium CM1 around the heating element HE is vaporized and the bubbles CM1$g$ are generated from a gas of the first cooling medium CM1. Therefore, due to latent heat generated when the first cooling medium CM1 is vaporized, heat of the heating element HE is absorbed and the heating element HE is cooled.

In this manner, in the second cooling phase PH2, in addition to the convective flow CF, the heating element HE is also cooled by vaporization of the first cooling medium CM1. Therefore, an effect of cooling the heating element HE in the second cooling phase PH2 is stronger than an effect of cooling the heating element HE in the first cooling phase PH1.

The bubbles CM1$g$ generated in the second cooling phase PH2 rise upward (+Z side) in the vertical direction and move, for example, in the first connection path 13. As described above, in the second cooling phase PH2, since the circulation CY1 of the first cooling medium CM1 to be described below is unlikely to be generated between the cooling chamber 11 and the radiator chamber 12, the temperature of the first cooling medium CM1 in the first connection path 13 remains relatively low. Accordingly, the bubbles CM that have moved in the first connection path 13 condense and return to a liquid again.

In the example in FIG. 2, the bubbles CM1$g$ move only to the first connection path 13, but the present invention is not limited thereto. In the second cooling phase PH2, the bubbles CM1$g$ may move to the second connection path 14 or may move to the radiator chamber 12 through the first connection path 13 or the second connection path 14. Also in the second connection path 14 and the radiator chamber 12, since the temperature of the first cooling medium CM1 remains relatively low, the bubbles CM1$g$ that have moved into the second connection path 14 and the radiator chamber 12 condense and return to a liquid again. That is, when the first cooling medium CM1 in the cooling chamber 11 is vaporized, at least a part of the vaporized first cooling medium CM1 condenses in any of the first connection path 13, the second connection path 14, and the radiator chamber 12.

When the heating element HE is cooled in the second cooling phase PH2 and the temperature of the heating element HE is lower than the boiling point of the first cooling medium CM1, the cooling phase returns from the second cooling phase PH2 to the first cooling phase PH1.

On the other hand, when the heating element HE is not sufficiently cooled in the second cooling phase PH2, the temperature of the heating element HE rises, and an amount of the vaporized first cooling medium CM1 increases to a certain extent, the cooling phase transitions from the second cooling phase PH2 to the third cooling phase PH3.

FIG. 3 shows the cooling device 10 in the third cooling phase PH3. As shown in FIG. 3, the third cooling phase PH3 is a phase in which the heating element HE is cooled by vaporization of the first cooling medium CM1 and the circulation CY1 of the first cooling medium CM1 generated between the cooling chamber 11 and the radiator chamber 12.

When the temperature of the heating element HE further increases, an amount of the vaporized first cooling medium CM1 increases and an amount of the bubbles CM1g increases. Here, the inner diameter D1 of the first connection path 13 and the inner diameter D2 of the second connection path 14 are set such that the bubbles CM1g which are the vaporized first cooling medium CM1 are likely to be retained in the first connection path 13 and the second connection path 14. Therefore, when an amount of the bubbles CM increases, the bubbles CM are retained in the first connection path 13. Accordingly, a pressure difference is generated between the part P11 in which the first connection path 13 is connected to the cooling chamber 11 and the part P21 in which the second connection path 14 is connected to the cooling chamber 11 according to a length of a part in the vertical direction (the Z axis direction) in which the bubbles CM1g are retained in the first connection path 13. That is, a pressure in the part P11 is lower than a pressure in the part P21.

Accordingly, the first cooling medium CM1 in the second connection path 14 moves to the cooling chamber 11 that is positioned on the lower side in the vertical direction due to gravity. When the first cooling medium CM1 in the second connection path 14 moves into the cooling chamber 11, a part of the first cooling medium CM1 in the cooling chamber 11 is pushed out to the first connection path 13 and moves to the radiator chamber 12 through the first connection path 13. According to inflow of the first cooling medium CM1 from the first connection path 13 and outflow of the first cooling medium CM1 from the second connection path 14, a part of the first cooling medium CM1 in the radiator chamber 12 is pushed out to the second connection path 14 and moves to the cooling chamber 11 through the second connection path 14. Accordingly, the circulation CY1 of the first cooling medium CM1 is generated between the cooling chamber 11 and the radiator chamber 12.

As described above, in the third cooling phase PH3, when a part of the first cooling medium CM1 in the cooling chamber 11 is vaporized, at least a part of the vaporized first cooling medium CM1 (the bubbles CM1g) moves into the first connection path 13. Then, in the third cooling phase PH3, the circulation CY1 is generated so that the first cooling medium CM1 in the cooling chamber 11 flows to the radiator chamber 12 through the first connection path 13 and the first cooling medium CM1 in the radiator chamber 12 flows to the cooling chamber 11 through the second connection path 14.

Since the temperature of the first cooling medium CM1 in the radiator chamber 12 remains relatively low in the first cooling phase PH1 and the second cooling phase PH2, the first cooling medium CM1 in the radiator chamber 12 is moved into the cooling chamber 11 by the circulation CY1, and thus the heating element HE can be further cooled.

In this manner, in the third cooling phase PH3, the heating element HE is cooled by the circulation CY1 of the first cooling medium CM1 in addition to vaporization of the first cooling medium CM1. Therefore, an effect of cooling the heating element HE in the third cooling phase PH3 is stronger than an effect of cooling the heating element HE in the second cooling phase PH2. In addition, in the third cooling phase PH3, a flow velocity of the circulation CY1 of the first cooling medium CM1 generated due to a pressure difference is higher than a flow velocity of the convective flow CF of the first cooling medium CM1. As a result, an effect of cooling the heating element HE is improved.

Here, when the circulation CY1 of the first cooling medium CM1 is generated, the first cooling medium CM1 having a relatively high temperature in the cooling chamber 11 flows into the radiator chamber 12. However, since the radiator chamber 12 releases heat of the first cooling medium CM1 to the outside, the first cooling medium CM1 having a relatively high temperature flowing from the cooling chamber 11 is cooled in the radiator chamber 12 and becomes the first cooling medium CM1 having a relatively low temperature, and flows into the cooling chamber 11 again.

In the third cooling phase PH3, the bubbles CM1g retained in the first connection path 13 are moved to the radiator chamber 12 together with the first cooling medium CM1 which is a liquid by the circulation CY1 of the first cooling medium CM1 and condense.

As described above, in the present embodiment, according to the temperature of the heating element HE, the cooling phase is automatically changed among the first cooling phase PH1 to the third cooling phase PH3. Accordingly, it is possible to realize an appropriate cooling phase according to the temperature of the heating element HE and it is possible to efficiently cool the heating element HE.

The type of the first cooling medium CM1 is preferably selected so that, for example, the cooling phase in the cooling device 10 can be changed among the first cooling phase PH1 to the third cooling phase PH3 described above. Specifically, as the first cooling medium CM1, a substance that can be vaporized by heat of the heating element HE is preferably selected. That is, the boiling point of the first cooling medium CM1 is preferably lower than a maximum temperature of the heating element HE. Accordingly, when the temperature of the heating element HE is higher than the boiling point of the first cooling medium CM1, the first cooling medium CM1 is vaporized, and the second cooling phase PH2 and the third cooling phase PH3 are realized. Therefore, the heating element HE is more easily cooled.

According to the present embodiment, as described above, it is possible to effectively cool the heating element HE by vaporization of the first cooling medium CM1 and the circulation CY1. Therefore, it is possible to improve cooling efficiency of the cooling device 10. In addition, for example, compared to when the heating element HE is cooled only by vaporization of the first cooling medium CM1, it is possible to reduce an amount of the vaporized first cooling medium CM1. Accordingly, it is not necessary to provide a large condenser for condensing bubbles CM1g in the cooling device, and it is possible to prevent the size of the cooling device from increasing.

In addition, for example, a method in which an instrument for applying a driving force to the first cooling medium CM1 such as a pump is provided in the cooling device, and thus the circulation CY1 of the first cooling medium CM1 is generated between the cooling chamber 11 and the radiator chamber 12 may also be conceived. However, in this case, the size of the cooling device is increased by the pump or the like.

On the other hand, according to the present embodiment, in the cooling device 10, the bubbles CM1g are used, gravity applied to the first cooling medium CM1 is used as a driving force, and thus the circulation CY1 of the first cooling medium CM1 can be generated. As a result, in the first cooling medium CM1, a flow velocity of the circulation CY1 is higher than a flow velocity of the convective flow CF. Therefore, according to the present embodiment, it is possible to improve cooling efficiency of the cooling device 10.

As described above, according to the present embodiment, it is possible to prevent the size of the cooling device from increasing and it is possible to improve cooling efficiency.

In addition, according to the present embodiment, the generated bubbles CM1g condense in any of the first connection path 13, the second connection path 14, and the radiator chamber 12 in which the temperature of the first cooling medium CM1 remains relatively low. Therefore, it is not necessary to provide a condenser irrespective of the size, and it is possible to prevent the size of the cooling device 10 from increasing.

In addition, according to the present embodiment, since the inner diameter D1 of the first connection path 13 has a size at which the bubbles CM1g are retained in the first connection path 13, the cooling phase is likely to transition from the second cooling phase PH2 to the third cooling phase PH3. Accordingly, the cooling device 10 can more easily cool the heating element HE and it is possible to further improve cooling efficiency of the cooling device 10. In addition, when the inner diameter D1 of the first connection path 13 is small enough for the bubbles CM1g to be retained, in the natural state, it is difficult for the first cooling medium CM1 of the radiator chamber 12 to move due to the first connection path 13 or the second connection path 14, and the circulation CY1 of the first cooling medium CM1 is unlikely to be generated between the cooling chamber 11 and the radiator chamber 12. Therefore, in the natural state, it is possible to prevent the occurrence of heat exchange between the cooling chamber 11 and the radiator chamber 12. As a result, the temperature of the first cooling medium CM1 in the radiator chamber 12 is likely to remain relatively low.

In addition, according to the present embodiment, the entire radiator chamber 12 is positioned above the cooling chamber 11 in the vertical direction. Therefore, in the third cooling phase PH3, the gravitational force on the first cooling medium CM1 due to a pressure difference is used, and the circulation CY1 of the first cooling medium CM1 is likely to be generated between the cooling chamber 11 and the radiator chamber 12.

In addition, according to the present embodiment, the first connection path 13 is connected to the upper end of the cooling chamber 11 in the vertical direction. Therefore, in the second cooling phase PH2 and the third cooling phase PH3, the bubbles CM1g are likely to move to the first connection path 13. Accordingly, the bubbles CM1g are likely to condense in the first connection path 13 or the radiator chamber 12. In addition, in the third cooling phase PH3, the bubbles CM1g are retained in the first connection path 13, and the circulation CY1 of the first cooling medium CM1 can be easily generated.

In addition, according to the present embodiment, the heating element HE is housed in the cooling chamber 11. Therefore, the first cooling medium CM1 comes directly in contact with the heating element HE. Therefore, it is possible to more easily cool the heating element HE by the first cooling medium CM1 and it is possible to further improve cooling efficiency of the cooling device 10.

In addition, for example, when a part of the first cooling medium CM1 is vaporized, a volume of the first cooling medium CM1 filled into the cooling chamber 11, the radiator chamber 12, the first connection path 13 and the second connection path 14 increases. Therefore, the pressure rises in the cooling chamber 11, the radiator chamber 12, the first connection path 13, and the second connection path 14, and there is a risk of the boiling point of the first cooling medium CM1 increasing. Accordingly, there is a risk of the cooling phase not transitioning to the second cooling phase PH2 and the third cooling phase PH3 even when the temperature of the heating element HE is relatively high. Therefore, there is a risk of the heating element HE not being appropriately cooled.

On the other hand, according to the present embodiment, the cooling device 10 further includes the elastic part 15. Therefore, when the first cooling medium CM1 is vaporized and the bubbles CM1g are generated, the elastic part 15 is deformed, and it is possible to prevent a pressure in the cooling chamber 11, the radiator chamber 12, the first connection path 13, and the second connection path 14 from increasing. Accordingly, it is possible to prevent the boiling point of the first cooling medium CM1 from increasing and the heating element HE is appropriately and easily cooled.

In addition, for example, when the cooling phase transitions to the second cooling phase PH2 and the third cooling phase PH3, a higher boiling point of the first cooling medium CM1 is preferable. This is because the temperature in the cooling chamber 11 when the cooling phase transitions to the second cooling phase PH2 and the third cooling phase PH3 increases, a temperature difference from the outside increases, and cooling efficiency is improved.

According to the present embodiment, the cooling device includes the elastic part 15 that absorbs a pressure variation, and a pressure absorption width of the elastic part 15 is adjusted. Therefore, a pressure in the second cooling phase PH2 and the third cooling phase PH3 can increase in a range in which the cooling phase can transition to the second cooling phase PH2 and the third cooling phase PH3. Therefore, it is possible to further improve cooling efficiency in the second cooling phase PH2 and the third cooling phase PH3.

In addition, according to the present embodiment, the elastic part 15 is a part of the wall 11a constituting the cooling chamber 11. Therefore, it is possible to prevent a pressure in the cooling chamber 11 in which the bubbles CM1g are generated from increasing, and it is possible to prevent the boiling point of the first cooling medium CM1 in the cooling chamber 11 from increasing.

In addition, according to the present embodiment, as the cooling phase, the first cooling phase PH1 in which the convective flow CF of the first cooling medium CM1 is generated is provided. Therefore, even if the temperature of the heating element HE is relatively low and the first cooling medium CM1 is not vaporized, it is possible to cool the heating element HE by the convective flow CF of the first cooling medium CM1.

Here, in the present embodiment, the following configuration can be used. In the following description, the same components as those described above will be appropriately denoted with the same reference numerals and descriptions thereof will be omitted.

In the present embodiment, when the cooling device 10 cools the heating element HE, for example, the cooling phase may be changed only between the first cooling phase PH1 and the second cooling phase PH2. In this case, in the second cooling phase PH2, the first cooling medium CM1 in the cooling chamber 11 is vaporized and thus the temperature of the heating element HE is lower than the boiling point of the first cooling medium CM1. Accordingly, the cooling phase is alternately switched between the first cooling phase PH1 and the second cooling phase PH2, and the heating element HE is appropriately and easily cooled according to the temperature.

In addition, in the present embodiment, in the vertical direction (the Z axis direction), the part P12 in which the first connection path 13 is connected to the radiator chamber 12 may be positioned at the same position as the part P11 in which the first connection path 13 is connected to the cooling chamber 11. In this case, a pressure difference when the cooling phase transitions from the second cooling phase PH2 to the third cooling phase PH3 is generated according to the inner diameter D1 of the first connection path 13.

In addition, in the present embodiment, while the heating element HE is positioned outward from the cooling chamber 11, the heating element HE may be cooled. In this case, for example, the heating element HE is attached to the wall 11a of the cooling chamber 11, and the heating element HE is cooled by the first cooling medium CM1 through the wall 11a.

In addition, in the present embodiment, as long as the elastic part 15 is elastically deformed when the bubbles CM1g are generated, a configuration thereof is not particularly limited. In the present embodiment, the elastic part 15 may be a part of the wall 12a of the radiator chamber 12, or a part of a wall that constitutes the first connection path 13 and the second connection path 14.

In addition, in the present embodiment, the elastic part 15 may be a sphere made of an elastic material or the like. In this case, the elastic part 15 is positioned in the cooling chamber 11, the radiator chamber 12, the first connection path 13, or the second connection path 14. In addition, in the present embodiment, the elastic part 15 may be a gas such as air.

In addition, while a case in which, when the cooling phase transitions to the third cooling phase PH3, the bubbles CM1g are retained only in the first connection path 13 has been described above, the present invention is not limited thereto. In the present embodiment, the bubbles CM1g can move to both the first connection path 13 and the second connection path 14, and when the cooling phase transitions from the second cooling phase PH2 to the third cooling phase PH3, the bubbles CM1g may be retained both in the first connection path 13 and the second connection path 14. In this case, a pressure of a part in which the connection path on the side in which more bubbles CM1g are retained is connected to the cooling chamber 11 decreases, and the cooling phase transitions to the third cooling phase PH3 due to a pressure difference therebetween. For example, when an amount of the bubbles CM1g retained in the second connection path 14 is larger than an amount of the bubbles CM1g retained in the first connection path 13, a circulation in a direction opposite to the circulation CY1 of the first cooling medium CM1 shown in FIG. 3 is generated.

Figure 4:
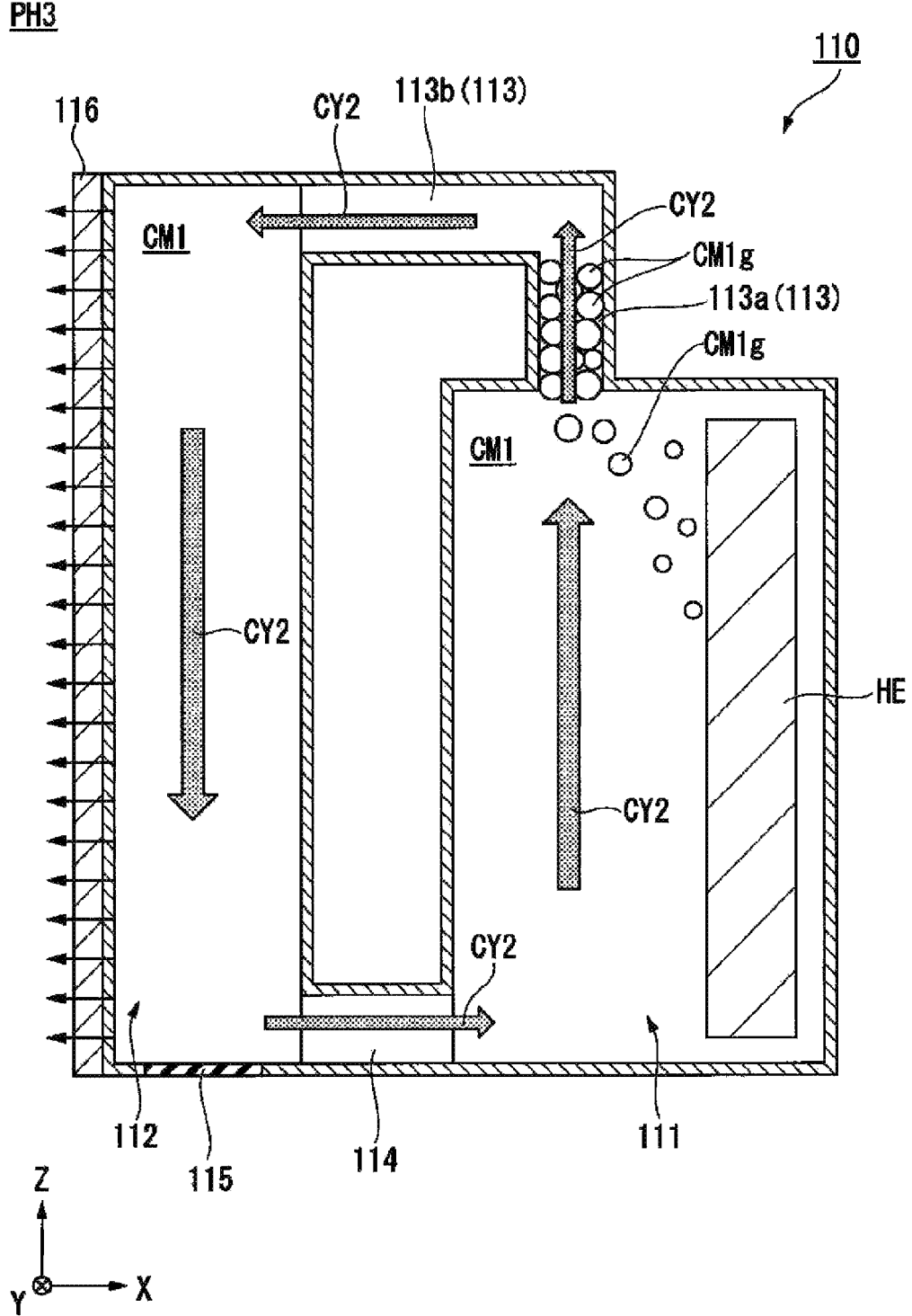
FIG. 4 is a schematic diagram showing a cooling device which is another example of the present embodiment.

In addition, in the present embodiment, the configuration shown in FIG. 4 may be used. FIG. 4 is a schematic diagram showing a cooling device 110 which is another example of the present embodiment. FIG. 4 shows the cooling device 110 in the third cooling phase PH3. As shown in FIG. 4, the cooling device 110 includes a cooling chamber 111, a radiator chamber 112, a first connection path 113, a second connection path 114, and an elastic part 115.

The cooling chamber 111 and the radiator chamber 112 are arranged in the horizontal direction (the X axis direction). The cooling chamber 111 and the radiator chamber 112 extend in the vertical direction (the Z axis direction). In the vertical direction, for example, a position of the lower end of the cooling chamber 111 in the vertical direction is the same as a position of the lower end of the radiator chamber 112 in the vertical direction. A position of the upper end of the radiator chamber 112 in the vertical direction is above, in the vertical direction, a position of the upper end of the cooling chamber 111 in the vertical direction. That is, in such a configuration, a part of the radiator chamber 112 is positioned above the cooling chamber 111 in the vertical direction.

A heat absorbing part 116 is attached to the radiator chamber 112. The heat absorbing part 116 is the same as the heat absorbing part 16 shown in FIG. 1 to FIG. 3 except that it is positioned on the side (X side) opposite to the cooling chamber 111 in the horizontal direction (the X axis direction) of the radiator chamber 112.

The first connection path 113 includes a first linear part 113a and a second linear part 113b. The first linear part 113a linearly extends from the upper end of the cooling chamber 111 in the vertical direction to the upper side thereof in the vertical direction. The second linear part 113b linearly extends from the upper end of the first linear part 113a in the vertical direction toward the side (−X side) of the radiator chamber 112 in the horizontal direction (the X axis direction). The end on the side of the radiator chamber 112 of the second linear part 113b is connected to the upper end in the vertical direction at the end on the side (+X side) of the cooling chamber 111 of the radiator chamber 112. In such a configuration, the entire first connection path 113 is positioned above the cooling chamber 111 in the vertical direction.

The second connection path 114 extends in the horizontal direction (the X axis direction). The second connection path 114 is connected to the lower end of the cooling chamber 111 in the vertical direction and the lower end of the radiator chamber 112 in the vertical direction. In the vertical direction, a position of the lower end of the second connection path 114 in the vertical direction is the same as, for example, a position of the lower end of the cooling chamber 111 in the vertical direction and a position of the lower end of the radiator chamber 112 in the vertical direction.

In such a configuration, the second connection path 114 does not include a part that is positioned above the cooling chamber 111 in the vertical direction. In other words, in such a configuration, the entire second connection path 114 is positioned vertically below the upper end of the cooling chamber 111 in the vertical direction.

The elastic part 115 is a part of the wall of the radiator chamber 112. The elastic part 115 is provided on a wall that is positioned at the lower end of the radiator chamber 112 in the vertical direction.

The configuration of the cooling device 110 is otherwise the same as the configuration of the cooling device 10 shown in FIG. 1 to FIG. 3.

In such a configuration, when the bubbles CM1g are retained in the first connection path 113, a pressure difference is generated between the cooling chamber 111 and the radiator chamber 112, and a circulation CY2 is generated. Therefore, in such a configuration, it is possible to prevent the size of the cooling device from increasing and it is possible to improve cooling efficiency.

Here, in such a configuration, the pressure difference is determined according to a length of the bubbles CM1g in the vertical direction (the Z axis direction) that are retained in the first linear part 113a of the first connection path 113. In addition, in such a configuration, the bubbles CM1g move only to the first connection path 113.

<Motor>

Figure 5:
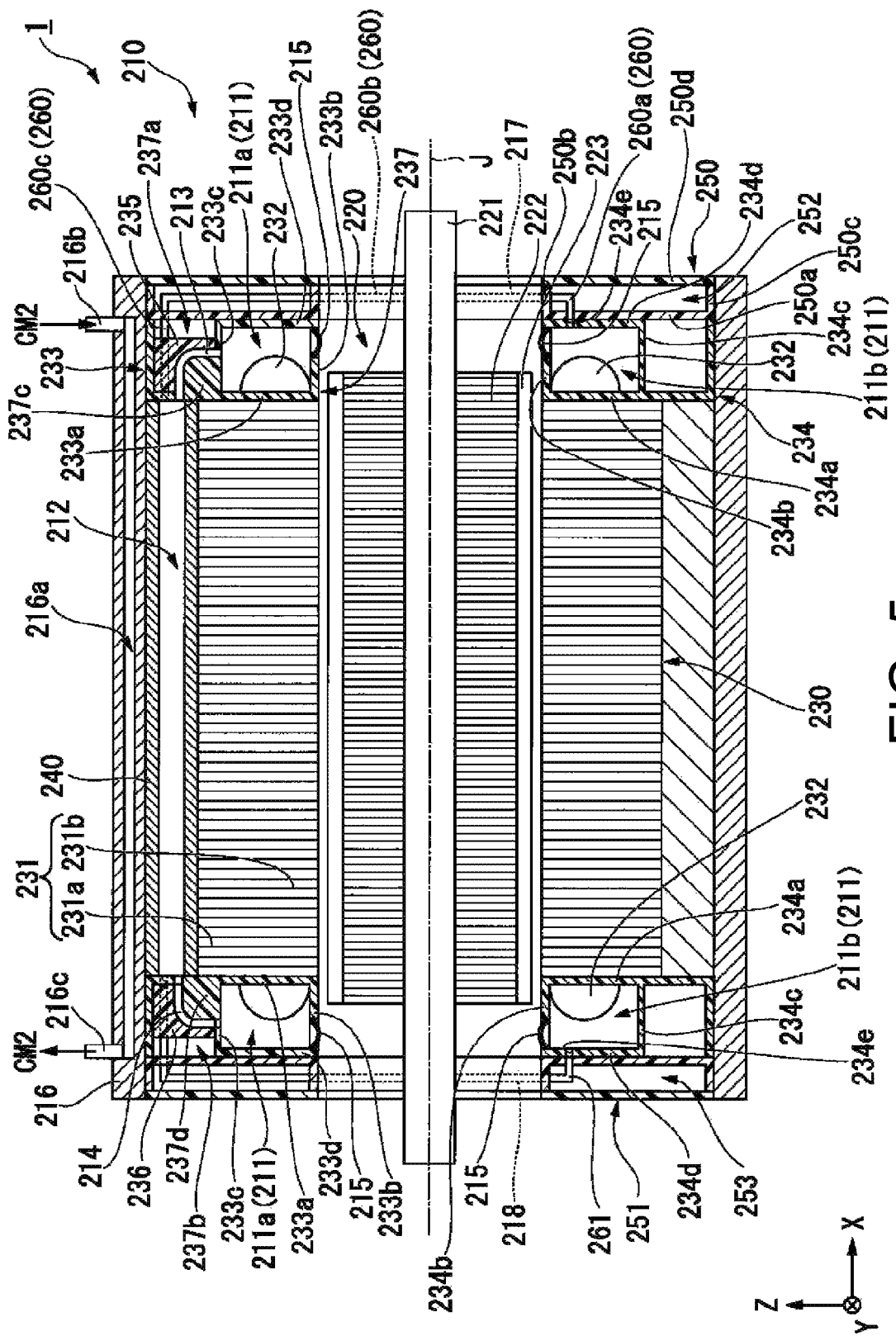
FIG. 5 is a cross-sectional view showing a motor of the present embodiment.
Figure 6:
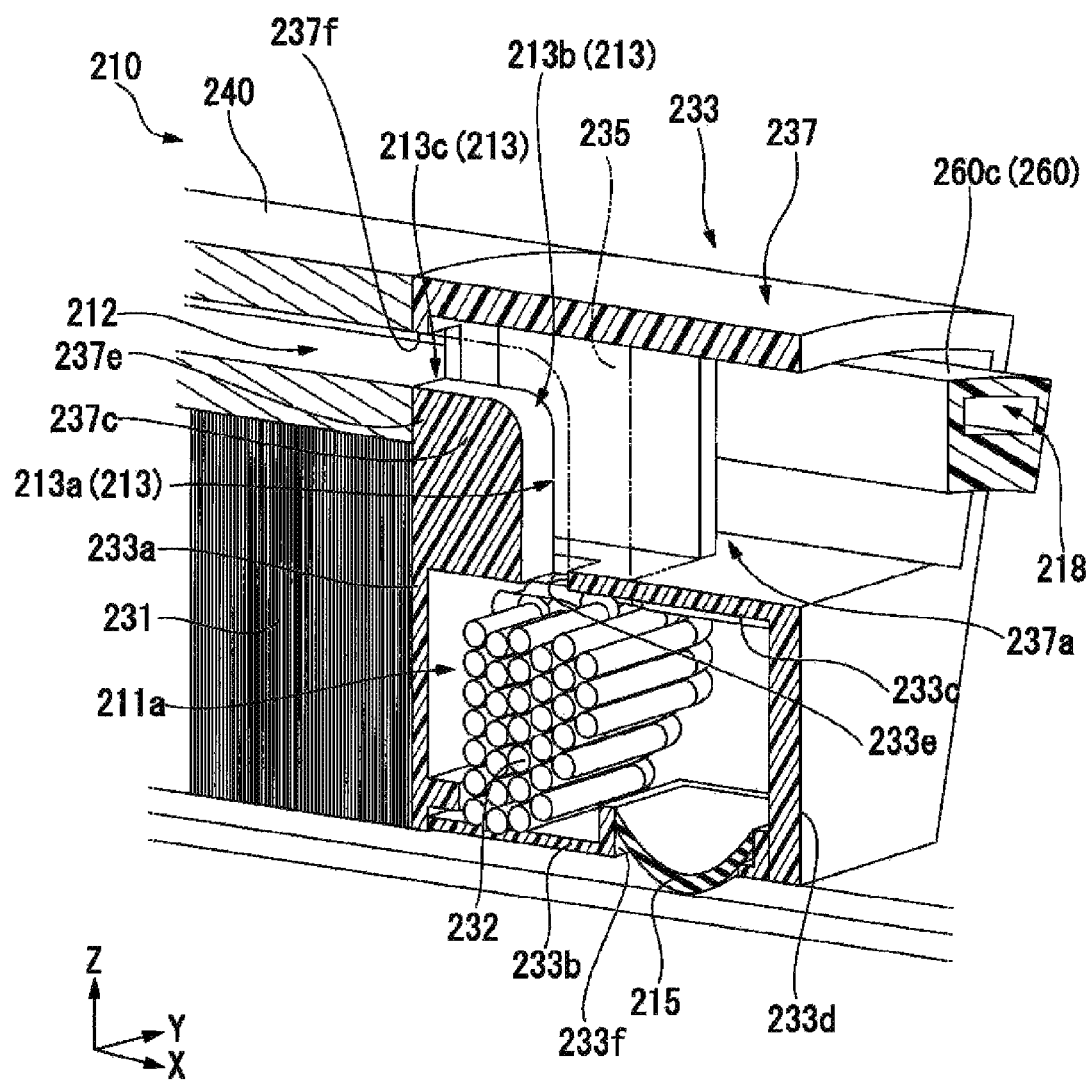
FIG. 6 is a perspective view showing a part of the motor of the present embodiment.
Figure 7:
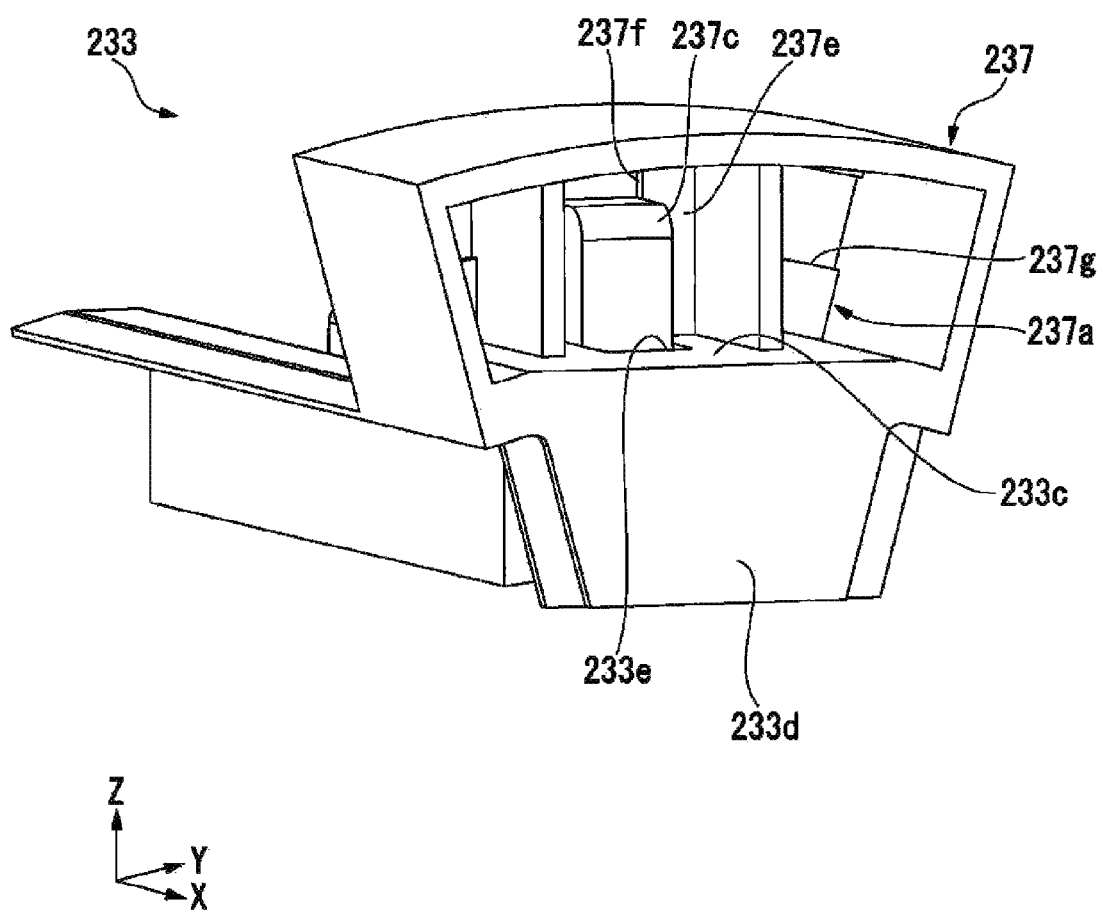
FIG. 7 is a perspective view showing an upper insulator of the present embodiment.
Figure 8:
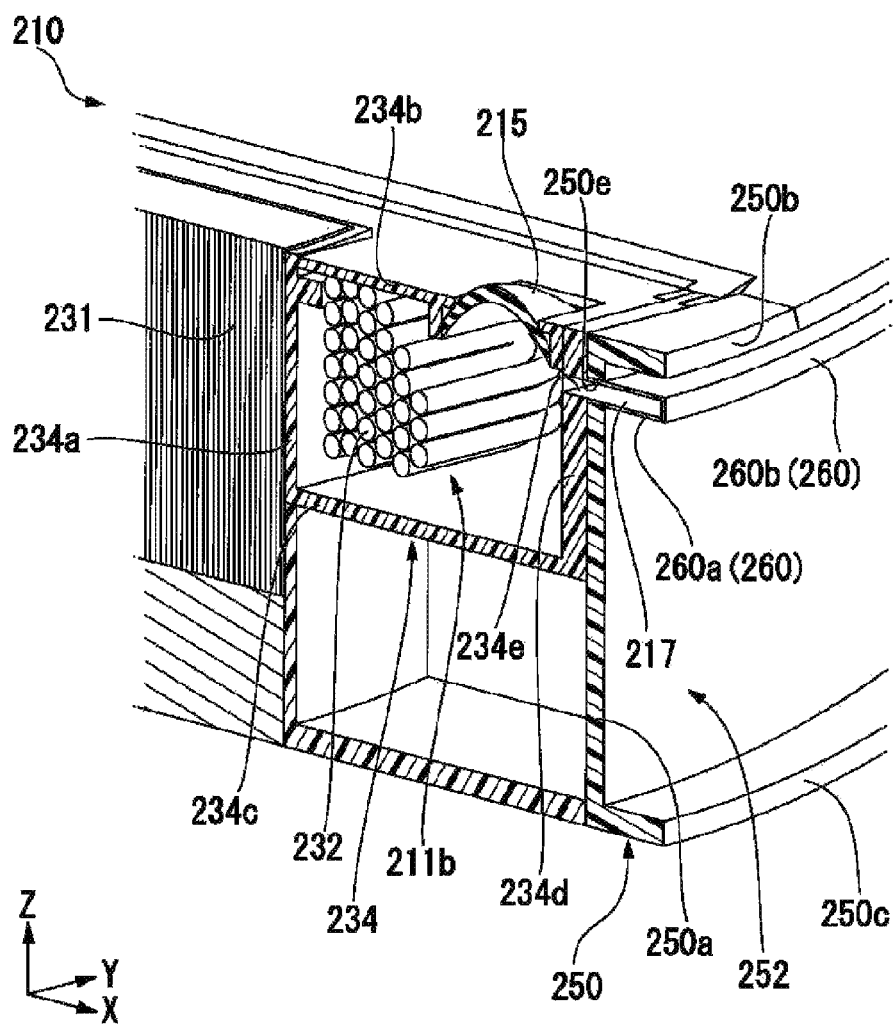
FIG. 8 is a perspective view showing a part of the motor of the present embodiment.

Next, an example in which the cooling device of the present embodiment is mounted on a motor will be described. FIG. 5 is a cross-sectional view showing a motor 1 of the present embodiment. FIG. 6 and FIG. 8 are perspective views showing a part of the motor 1 of the present embodiment. FIG. 7 is a perspective view showing an upper insulator 233 of the present embodiment. In FIG. 6, a first connection path member 235 is indicated by a two-dot line.

Here, in the following description, a direction in which the central axis J extends (the X axis direction) is defined as a longitudinal direction. A positive side in the X axis direction (+X side) with respect to a certain object may be referred to as a "front side" and a negative side in the X axis direction (−X side) with respect to a certain object may be referred to as a "rear side." Here, the longitudinal direction, the front side, and the rear side are names that are simply used for explanation and do not limit the actual positional relationship and direction.

In addition, unless otherwise specified, a direction (the X axis direction) parallel to the central axis J may be simply referred to as an "axis direction," a radial direction with respect to the central axis J may be simply referred to as a "radial direction," and a circumferential direction with respect to the central axis J, that is, an axial circumference of the central axis J, may be simply referred to as a "circumferential direction."

As shown in FIG. 5, the motor 1 of the present embodiment includes a cooling device 210, a rotor 220, a stator 230, a housing 240, a first lid member 250, a second lid member 251, a first connection pipe 260, a second connection pipe 261, and a cooling jacket (heat absorbing part) 216.

The cooling device 210 includes a plurality of cooling chambers 211, a radiator chamber 212, a first connection path 213, a second connection path 214, and an elastic part 215. In the present embodiment, a cooling chamber 211 includes a first cooling chamber (cooling chamber) 211a and a second cooling chamber (cooling chamber) 211b.

Similarly to the cooling device 10 shown in FIG. 1 to FIG. 3, the first cooling medium CM1 is filled into the cooling chamber 211, the radiator chamber 212, the first connection path 213, and the second connection path 214. In the present embodiment, the first cooling medium CM1 has, for example, an insulation property.

In the present embodiment, the cooling chamber 211, the first connection path 213, the second connection path 214, and the elastic part 215 are provided in the stator 230. In the present embodiment, the radiator chamber 212 is provided in the housing 240. Components of the cooling device 210 will be described below together with the configuration of the stator 230 and the housing 240.

The rotor 220 includes a shaft 221, a rotor core 222, and a rotor magnet 223. The shaft 221 is centered on the central axis J that extends in one direction (the X axis direction). The shaft 221 is rotatably supported around the central axis J by a bearing (not shown).

The rotor core 222 surrounds the shaft 221 with respect to an axis and is fixed to the shaft 221. The rotor magnet 223 is fixed to the outer surface along the central axis J in the rotor core 222. The rotor core 222 and the rotor magnet 223 rotate integrally with the shaft 221.

The stator 230 is positioned outward from the rotor 220 in the radial direction. The stator 230 surrounds the rotor 220 with respect to the central axis J. The stator 230 includes a stator core 231, a plurality of coils 232, the upper insulator (insulator) 233, and a lower insulator (insulator) 234.

The stator core 231 includes a core back part 231a and a tooth part 231b. The shape of the core back part 231a is, for example, a cylindrical shape concentric with the shaft 221. The tooth part 231b extends from an inner surface of the core back part 231a to the shaft 221. A plurality of tooth parts 231b are provided and arranged at equal intervals in the circumferential direction of the inner surface of the core back part 231a.

The coil 232 is formed by winding a conductive wire. The coil 232 is wound on each of the tooth parts 231b through the upper insulator 233 or the lower insulator 234. The upper insulator 233 and the lower insulator 234 are mounted on each of the tooth parts 231b. The coil 232 excites the stator core 231.

In the present embodiment, for example, the upper insulator 233 is mounted on the tooth part 231b that is positioned above the shaft 221 in the vertical direction among the plurality of tooth parts 231b. The upper insulator 233 includes an insulator main body 237, the first connection path member 235, and a second connection path member 236. The first connection path member 235 and the second connection path member 236 are attached to the insulator main body 237. The first connection path member 235 is attached to the +X side end of the insulator main body 237 in the horizontal direction. The second connection path member 236 is attached to the −X side end of the insulator main body 237 in the horizontal direction. The first connection path member 235 and the second connection path member 236 are, for example, members that are separate from the insulator main body 237.

The insulator main body 237 includes the first cooling chamber 211a, a housing recess 237a that is positioned on the +X side of the insulator main body 237 in the horizontal direction, a housing recess 237b that is positioned on the −X side of the insulator main body 237 in the horizontal direction, a rib part 237c that is positioned on the +X side of the insulator main body 237 in the horizontal direction, and a rib part 237d that is positioned on the −X side of the insulator main body 237 in the horizontal direction. That is, the upper insulator 233 includes the first cooling chamber 211a, the housing recess 237a, the housing recess 237b, the rib part 237c, and the rib part 237d.

The housing recess 237a and the rib part 237c, and the housing recess 237b and the rib part 237d are the same except that they are reversed in the axis direction (the X axis direction).

The first cooling chamber 211a has the same function as the cooling chamber 11 described above with reference to FIG. 1 to FIG. 3. Although not shown, in the present embodiment, for example, the first cooling chamber 211a has an annular shape that surrounds both sides of the tooth part 231*b* in the axis direction and both sides of the tooth part 231*b* in the circumferential direction. In the present embodiment, the coil 232 positioned above the central axis J in the vertical direction is housed in the first cooling chamber 211*a*. That is, in the present embodiment, the heating element HE cooled by the first cooling chamber 211*a* is the coil 232.

The first cooling chamber 211*a* includes a mounting wall 233*a*, an inner wall 233*b*, an outer wall 233*c*, and a lid 233*d*. In the present embodiment, the mounting wall 233*a*, the inner wall 233*b*, the outer wall 233*c*, and the lid 233*d* are provided on both end sides of the stator core 231 in the axis direction (the X axis direction).

Here, in the following description, with respect to components of the insulators that are positioned on both end sides of the stator core 231 in the axis direction, a side on the stator core 231 in the axis direction may be simply referred to as "an inner side in the axis direction" and a side opposite to the stator core 231 in the axis direction may be simply referred to as "an outer side in the axis direction."

The mounting wall 233*a* is a part that is in contact with and mounted on the tooth part 231*b*. The mounting wall 233*a* is positioned between the stator core 231 and the coil 232 in the axis direction (the X axis direction). That is, at least a part of the upper insulator 233 is positioned between the stator core 231 and the coil 232.

The inner wall 233*b* extends from an inner side end (the lower side in the vertical direction) of the mounting wall 233*a* in the radial direction to the outer side in the axis direction. As shown in FIG. 6, in the present embodiment, for example, the inner wall 233*b* is a member that is separate from the mounting wall 233*a*, the outer wall 233*c*, and the lid 233*d*.

The elastic part 215 is provided on the inner wall 233*b*. The elastic part 215 has the same function as the elastic part 15 described above with reference to FIG. 1 to FIG. 3. That is, when the elastic part 215 is deformed, it is possible to prevent a pressure from increasing in the plurality of cooling chambers 211, the radiator chamber 212, the first connection path 213, and the second connection path 214. In the present embodiment, the elastic part 215 is positioned in a mounting hole 233*f* that penetrates the inner wall 233*b* in the radial direction. The elastic part 215 blocks the mounting hole 233*f*. In the present embodiment, for example, the elastic part 215 is positioned at the outer side end of the inner wall 233*b* in the axis direction. The elastic part 215 has, for example, a shape that protrudes inward in the radial direction.

As shown in FIG. 5, the outer wall 233*c* extends from the outer side end of the mounting wall 233*a* in the radial direction to the outer side in the axis direction. As shown in FIG. 6 and FIG. 7, the outer wall 233*c* includes a connection hole 233*e* that is a hole that penetrates the outer wall 233*c* in the radial direction (vertical direction). The lid 233*d* connects the outer side end of the inner wall 233*b* in the axis direction to the outer side end of the outer wall 233*c* in the axis direction. The lid 233*d* covers the outer side of the coil 232 in the axis direction.

The housing recess 237*a* is recessed from the outer side of the insulator main body 237 in the axis direction (+X side) to the inner side in the axis direction (−X side). The housing recess 237*a* is positioned on the outer side of the first cooling chamber 211*a* in the radial direction (the upper side in the vertical direction, +Z side). An inner side wall of the housing recess 237*a* in the radial direction (the lower side in the vertical direction, −Z side) is, for example, the outer wall 233*c* of the first cooling chamber 211*a*.

The housing recess 237*a* includes a bottom 237*e*. The bottom 237*e* is an inner side wall of the housing recess 237*a* in the axis direction. The bottom 237*e* includes a first connection hole 237*f* that is a hole that penetrates the bottom 237*e* in the axis direction. The first connection hole 237*f* is positioned at the outer side of the rib part 237*c* in the radial direction (the upper side in the vertical direction, +Z side). The first connection hole 237*f* is connected to the radiator chamber 212.

As shown in FIG. 7, the bottom 237*e* includes a second connection hole 237*g* that is a hole that penetrates the bottom 237*e* in the axis direction. The second connection hole 237*g* is connected to the radiator chamber 212. A second connection path 218 to be described below is connected to the second connection hole 237*g*.

The rib part 237*c* projects from the bottom 237*e* to the outer side in the axis direction (+X side). The rib part 237*c* is connected to the outer wall 233*c*. The outer side end of a connection part of the bottom 237*e* in the rib part 237*c* in the radial direction (the upper side in the vertical direction, +Z side) is positioned at the inner side end (the lower side in the vertical direction, −Z side) in the radial direction on the inner edge of the first connection hole 237*f*. The outer side end of a connection part of the outer wall 233*c* in the rib part 237*c* in the axis direction is positioned at the inner side end in the axis direction (−X side) on the inner edge of the connection hole 233*e*.

As shown in FIG. 6, the first connection path member 235 is housed in the housing recess 237*a*. The first connection path member 235 is fixed into the housing recess 237*a*. The first connection path member 235 faces the rib part 237*c*. The first connection path 213 is provided between the first connection path member 235 and the rib part 237*c*. That is, the first connection path member 235 and the rib part 237*c* constitute the first connection path 213. The first connection path 213 has the same function as the first connection path 13 described above with reference to FIG. 1 to FIG. 3.

In the present embodiment, the first connection path 213 is constituted by a surface that faces the rib part 237*c* in the first connection path member 235 and a surface that faces the first connection path member 235 in the rib part 237*c*. That is, the first connection path member 235 includes at least a part of the first connection path 213.

The first connection path 213 is connected to the first cooling chamber 211*a* through the connection hole 233*e* of the outer wall 233*c*. The first connection path 213 is connected to the radiator chamber 212 through the first connection hole 237*f*.

In the present embodiment, the entire first connection path 213 is positioned above the first cooling chamber 211*a* in the vertical direction. The first connection path 213 includes a first linear part 213*a*, an arc part 213*b*, and a second linear part 213*c*. The first linear part 213*a* extends outward from the first cooling chamber 211*a* in the radial direction (the upper side in the vertical direction).

The arc part 213*b* is connected to the outer side end of the first linear part 213*a* in the radial direction (the upper side in the vertical direction, +Z side). The arc part 213*b* has an arc shape that is positioned on the inner side in the axis direction (−X side) toward the outer side in the radial direction (the upper side in the vertical direction).

The second linear part 213*c* is connected to the inner side end of the arc part 213*b* in the axis direction. The second linear part 213*c* extends to the radiator chamber 212 in the axis direction (the X axis direction).

As shown in FIG. 5, the second connection path member 236 is housed in the housing recess 237b. The second connection path member 236 is fixed into the housing recess 237b. The second connection path 214 is provided between the second connection path member 236 and the rib part 237d. The second connection path 214 has the same function as the second connection path 14 described above with reference to FIG. 1 to FIG. 3.

In the present embodiment, the second connection path 214 is constituted by a surface that faces the rib part 237d in the second connection path member 236 and a surface that faces the second connection path member 236 in the rib part 237d. That is, the second connection path member 236 includes at least a part of the second connection path 214. The other parts of the second connection path 214 are the same as those of the first connection path 213 except that they are reversed in the axis direction.

In the present embodiment, the lower insulator 234 is mounted, for example, on the tooth part 231b that is positioned below the shaft 221 in the vertical direction among the tooth parts 231b. The lower insulator 234 includes the second cooling chamber 211b. The second cooling chamber 211b is positioned below the first cooling chamber 211a in the vertical direction.

Although not shown, the second cooling chamber 211b has an annular shape that surrounds both sides of the tooth part 231b in the axis direction and both sides thereof in the circumferential direction. In the present embodiment, the coil 232 positioned below the central axis J in the vertical direction is housed in the second cooling chamber 211b. That is, in the present embodiment, the heating element HE cooled by the second cooling chamber 211b is the coil 232.

The second cooling chamber 211b includes a mounting wall 234a, an inner wall 234b, an outer wall 234c, and a lid 234d. In the present embodiment, the mounting wall 234a, the inner wall 234b, the outer wall 234c, and the lid 234d are provided on both end sides of the stator core 231 in the axis direction (the X axis direction).

As shown in FIG. 8, the mounting wall 234a is the same as the mounting wall 233a of the first cooling chamber 211a. The inner wall 234b is the same as the inner wall 233b of the first cooling chamber 211a. Unlike the outer wall 233c of the first cooling chamber 211a, the outer wall 234c does not include the connection hole 233e. The other parts of the outer wall 234c are the same as those of the outer wall 233c of the first cooling chamber 211a.

The lid 234d includes a connection hole 234e that penetrates the lid 234d in the axis direction (the X axis direction). The first connection pipe 260 is connected to the connection hole 234e that is positioned on the front side (+X side) of the stator core 231. As shown in FIG. 5, the second connection pipe 261 is connected to the connection hole 234c that is positioned on the rear side (−X side) of the stator core 231. The other parts of the lid 234d are the same as those of the lid 233d of the first cooling chamber 211a.

The housing 240 has a tubular shape that surrounds the stator core 231 in the circumferential direction. The housing 240 has, for example, a cylindrical shape centered on the central axis J. The stator core 231 is fitted into the inner circumferential surface of the housing 240. The housing 240 is made of, for example, a metal.

The housing 240 includes the radiator chamber 212. The radiator chamber 212 has the same function as the radiator chamber 12 described above with reference to FIG. 1 to FIG. 3. In the present embodiment, for example, the entire radiator chamber 212 is positioned above the first cooling chamber 211a in the vertical direction. The radiator chamber 212 extends to, for example, the entire housing 240 in the axis direction (the X axis direction). For example, the radiator chamber 212 is provided for each upper insulator 233.

The first lid member 250 is attached to the front side (+X side) of the stator 230. The first lid member 250 covers the front side of the stator 230. The first lid member 250 includes an annular bottom 250a, an inner tubular part 250b, an outer tubular part 250c, and an annular lid 250d.

The annular bottom 250a has, for example, an annular plate shape centered on the central axis J. The annular bottom 250a is in contact with the lid 233d on the front side (+X side) in the upper insulator 233 and the lid 234d on the front side in the lower insulator 234. As shown in FIG. 8, the annular bottom 250a includes an insertion hole 250e that penetrates the annular bottom 250a in the axis direction (the X axis direction). The insertion hole 250e faces the connection hole 234e in the axis direction (the X axis direction).

The inner tubular part 250b has, for example, a cylindrical shape that extends from the inner edge inside the annular bottom 250a in the radial direction to the front side (+X side). The outer tubular part 250c has, for example, a cylindrical shape that extends from the outer edge outward from the annular bottom 250a in the radial direction to the front side. As shown in FIG. 5, the annular lid 250d is connected to the front side end of the inner tubular part 250b and the front side end of the outer tubular part 250c. The annular lid 250d covers the front side of the annular bottom 250a.

The first connection pipe 260 is housed inside the first lid member 250, that is, a first connection space 252 which is a space surrounded by the annular bottom 250a, the inner tubular part 250b, the outer tubular part 250c, and the annular lid 250d.

The second lid member 251 is attached to the rear side (−X side) of the stator 230. The second lid member 251 covers the rear side of the stator 230. The second lid member 251 is the same as the first lid member 250 except that it is reversed in the axis direction (the X axis direction). The second connection pipe 261 is housed in a second connection space 253 that is a space inside the second lid member 251.

As shown in FIG. 6 and FIG. 8, the first connection pipe 260 includes a cooling chamber connection part 260a, an arcuate part 260b, and a radiator chamber connection part 260c. The cooling chamber connection part 260a extends in the axis direction (the X axis direction). The end on the rear side (−X side) of the cooling chamber connection part 260a is inserted into the insertion hole 250e. The inside of the cooling chamber connection part 260a is connected to the second cooling chamber 211b.

As shown in FIG. 8, the arcuate part 260b is connected to the end on the front side (+X side) of the cooling chamber connection part 260a. The arcuate part 260b extends in the first connection space 252 in the circumferential direction from the lower side in the vertical direction to the upper side in the vertical direction.

As shown in FIG. 5, the radiator chamber connection part 260c is connected to the upper end of the arcuate part 260b in the vertical direction. The radiator chamber connection part 260c extends in the axis direction (the X axis direction). The end on the rear side (−X side) of the radiator chamber connection part 260c is connected to the radiator chamber 212.

The second connection pipe 261 is the same as the first connection pipe 260 except that it is reversed in the axis direction (the X axis direction).

The inside of the first connection pipe 260 is a first connection path 217 into which the first cooling medium CM1 is filled. The first connection path 217 is connected to the second cooling chamber 211b and the radiator chamber 212. The inside of the second connection pipe 261 is the second connection path 218 into which the first cooling medium CM1 is filled. The second connection path 218 is connected to the second cooling chamber 211b and the radiator chamber 212. That is, the first connection path 217 and the second connection path 218 connected to the second cooling chamber 211b are connected to the radiator chamber 212 to which the first cooling chamber 211a is connected. For example, the second connection path 218 is connected to the radiator chamber 212 through the second connection hole 237g (refer to FIG. 7).

Regarding the relationship between the second cooling chamber 211b and the radiator chamber 212, the first connection path 217 has the same function as the first connection path 13 described above with reference to FIG. 1 to FIG. 3. Regarding the relationship between the second cooling chamber 211b and the radiator chamber 212, the second connection path 218 has the same function as the second connection path 14 described above with reference to FIG. 1 to FIG. 3. That is, in the present embodiment, the cooling device 210 includes the first connection path 217 and the second connection path 218.

The cooling jacket 216 has a cylindrical shape that surrounds the outer sides of the stator 230, the first lid member 250, and the second lid member 251 in the radial direction. The cooling jacket 216 includes a cooling flow path 216a. A second cooling medium CM2 is housed in the cooling flow path 216a. That is, the second cooling medium CM2 is housed in the cooling jacket 216. The second cooling medium CM2 absorbs heat from the first cooling medium CM1 in the radiator chamber 212. That is, the cooling jacket 216 absorbs heat from the first cooling medium CM1 in the radiator chamber 212 by the second cooling medium CM2 in the cooling flow path 216a.

As the second cooling medium CM2, a medium that can absorb heat in the radiator chamber 212 may be used. For example, the second cooling medium CM2 may be the same as or different from the first cooling medium CM1. The second cooling medium CM2 is, for example, water.

The cooling flow path 216a is positioned above the radiator chamber 212 in the vertical direction. An input port 216b is connected to the end on the front side (+X side) of the cooling flow path 216a. An output port 216c is connected to the end on the rear side (−X side) of the cooling flow path 216a.

The second cooling medium CM2 flows into the cooling flow path 216a from the input port 216b. The second cooling medium CM2 flowing into the cooling flow path 216a flows out from the output port 216c. Accordingly, the second cooling medium CM2 circulates in the cooling flow path 216a.

According to the present embodiment, since the motor 1 includes the cooling device 210 having the same cooling structure as the cooling device 10 shown in FIG. 1 to FIG. 3, it is possible to efficiently cool the motor 1 while preventing the size of the motor 1 from increasing. In the present embodiment, since the heating element HE is the coil 232, it is possible to efficiently cool the coil 232.

In addition, according to the present embodiment, the first cooling medium CM1 has an insulation property, and the coil 232 is housed in the cooling chamber 211. Therefore, while the coil 232 is immersed in the first cooling medium CM1, it is possible to cool the coil 232. Accordingly, it is possible to additionally cool the coil 232.

In addition, when the motor is cooled, since the coil that generates heat in the motor is positioned inside the motor, it is difficult to release heat of the coil to the outside of the motor. Therefore, a cooling method in which latent heat generated when the cooling medium is vaporized is used to cool the coil, and the vaporized cooling medium is liquefied in a condenser that is separately provided and is used. Accordingly, there is a problem of the size of the motor increasing.

On the other hand, according to the present embodiment, when a circulation of the first cooling medium CM1 is generated between the cooling chamber 211 and the radiator chamber 212, heat of the coil 232 can be released from the radiator chamber 212 that is positioned outward from the stator core 231 in the radial direction to the outside of the motor 1. Therefore, it is not necessary to provide the condenser, and it is possible to efficiently cool the coil 232 while preventing the size of the motor 1 from increasing. In this manner, the cooling device 210 of the present embodiment does not have particularly a strong effect when it is used for the motor 1.

In addition, for example, when the radiator chamber 212 is arranged outward from the stator core 231 in the radial direction for each coil 232, the radiator chamber 212 of the coil 232 positioned below the central axis J in the vertical direction is positioned below the cooling chamber 211 in which the coil 232 is housed in the vertical direction. Therefore, it is not possible to use gravity on the first cooling medium CM1 as a driving force generating the circulation CY1, and the third cooling phase PH3 is not realized. Therefore, it is not possible to efficiently cool the coil 232 positioned below the central axis J in the vertical direction in some cases.

On the other hand, according to the present embodiment, the first connection path 217 and the second connection path 218 that connect the second cooling chamber 211b positioned below the first cooling chamber 211a in the vertical direction and the radiator chamber 212 to which the first cooling chamber 211a is connected are provided. Therefore, the radiator chamber 212 positioned above the second cooling chamber 211b in the vertical direction can be connected to the second cooling chamber 211b which cools the coil 232 positioned below the central axis J in the vertical direction. Therefore, according to the present embodiment, it is possible to efficiently cool the coil 232 positioned below the central axis J in the vertical direction using the third cooling phase PH3.

In addition, according to the present embodiment, the upper insulator 233 and the lower insulator 234 include the cooling chamber 211. Therefore, the coil 232 is easily housed in the cooling chamber 211.

In addition, according to the present embodiment, the first connection path member 235 including at least a part of the first connection path 213 and the second connection path member 236 including at least a part of the second connection path 214 are members that are separate from the insulator main body 237. Therefore, it is possible to change the size of the first connection path 213 and the size of the second connection path 214 by exchanging only the first connection path member 235 and the second connection path member 236. Therefore, according to the present embodiment, it is easy to change the size of the first connection path 213 and the size of the second connection path 214.

In addition, according to the present embodiment, since the cooling jacket 216 is provided as a heat absorbing part, the temperature of the first cooling medium CM1 in the radiator chamber 212 can remain relatively low. Accordingly, the coil 232 which is the heating element HE is more easily cooled.

In addition, for example, when the elastic part 215 is provided in the radiator chamber 212 in the motor 1 of the present embodiment, since it is necessary to secure a space in which the elastic part 215 is deformed, there is a risk of the size of the motor 1 increasing, for example, in the radial direction.

On the other hand, according to the present embodiment, since the elastic part 215 is provided in the cooling chamber 211, a space inside the upper insulator 233 and the lower insulator 234 in the radial direction can be used as a space in which the elastic part 215 is deformed. Accordingly, it is possible to provide the elastic part 215 while preventing the size of the motor 1 from increasing in the radial direction.

Here, in the motor 1 of the present embodiment, the following configuration can be used.

In the present embodiment, the first connection path 213 and the second connection path 214, and the first connection path 217 and the second connection path 218 may be connected to the cooling chamber 211. In this case, for example, the radiator chamber 212 is provided outward from the tooth part 231b on which each coil 232 is mounted in the radial direction. In such a configuration, it is possible to efficiently cool all of the coils 232 even if a motor 1 reversed in the vertical direction and is used.

In addition, in the present embodiment, for example, only one cooling chamber 211 may be provided. In this case, all of the coils 232 may be housed in one cooling chamber 211.

Here, an instrument to which the cooling device of the present embodiment is applied is not particularly limited, and the cooling device may be mounted in an instrument other than a motor.

In addition, the configurations described above can be appropriately combined in a range in which they are not inconsistent with each other.

The invention claimed is:

1. A motor, comprising:
   a cooling device configured to cool a heating element, the cooling device comprising:
      a cooling chamber, cooling the heating element by a first cooling medium;
      a radiator chamber, releasing heat of the first cooling medium to an outside; and
      a first connection path and a second connection path, connecting the cooling chamber to the radiator chamber,
      wherein at least a part of the radiator chamber is positioned above the cooling chamber in a vertical direction,
      wherein a part in which the first connection path is connected to the radiator chamber is positioned at a same part in which the first connection path is connected to the cooling chamber in the vertical direction or is positioned above a part in which the first connection path is connected to the cooling chamber, and
      when a part of the first cooling medium in the cooling chamber is vaporized, at least a part of the first cooling medium which is vaporized moves into the first connection path, and
      a circulation is generated in which the first cooling medium in the cooling chamber flows to the radiator chamber through the first connection path, and the first cooling medium in the radiator chamber flows into the cooling chamber through the second connection path,
   a rotor, including a shaft centered on a central axis that extends in one direction; and
   a stator, being positioned outward from the rotor in a radial direction,
   wherein the stator includes a stator core and a coil that excites the stator core,
   the heating element is the coil,
   the first cooling medium has an insulation property,
   the coil is housed in the cooling chamber,
   the cooling device includes a plurality of the cooling chambers,
   wherein the stator includes a plurality of the coils,
   wherein the cooling chamber includes a first cooling chamber and a second cooling chamber that is positioned below the first cooling chamber in the vertical direction,
   wherein the first connection path and the second connection path connected to the second cooling chamber are connected to the radiator chamber to which the first cooling chamber is connected, and
   the stator includes an insulator of which at least a part is positioned between the stator core and the coil, and
   the insulator includes the cooling chamber.

2. The motor according to claim 1, wherein the insulator comprising:
   an insulator main body;
   a first connection path member which is attached to the insulator main body and includes at least a part of the first connection path; and
   a second connection path member which is attached to the insulator main body and includes at least a part of the second connection path,
   wherein the first connection path member and the second connection path member are members that are separate from the insulator main body.

3. The motor according to claim 1, comprising:
   a heat absorbing part in which a second cooling medium is housed and which absorbs heat from the first cooling medium in the radiator chamber.

* * * * *